Aug. 29, 1967    J. P. MOORHEAD ET AL    3,338,187
BULKHEAD
Original Filed March 21, 1962    3 Sheets-Sheet 1
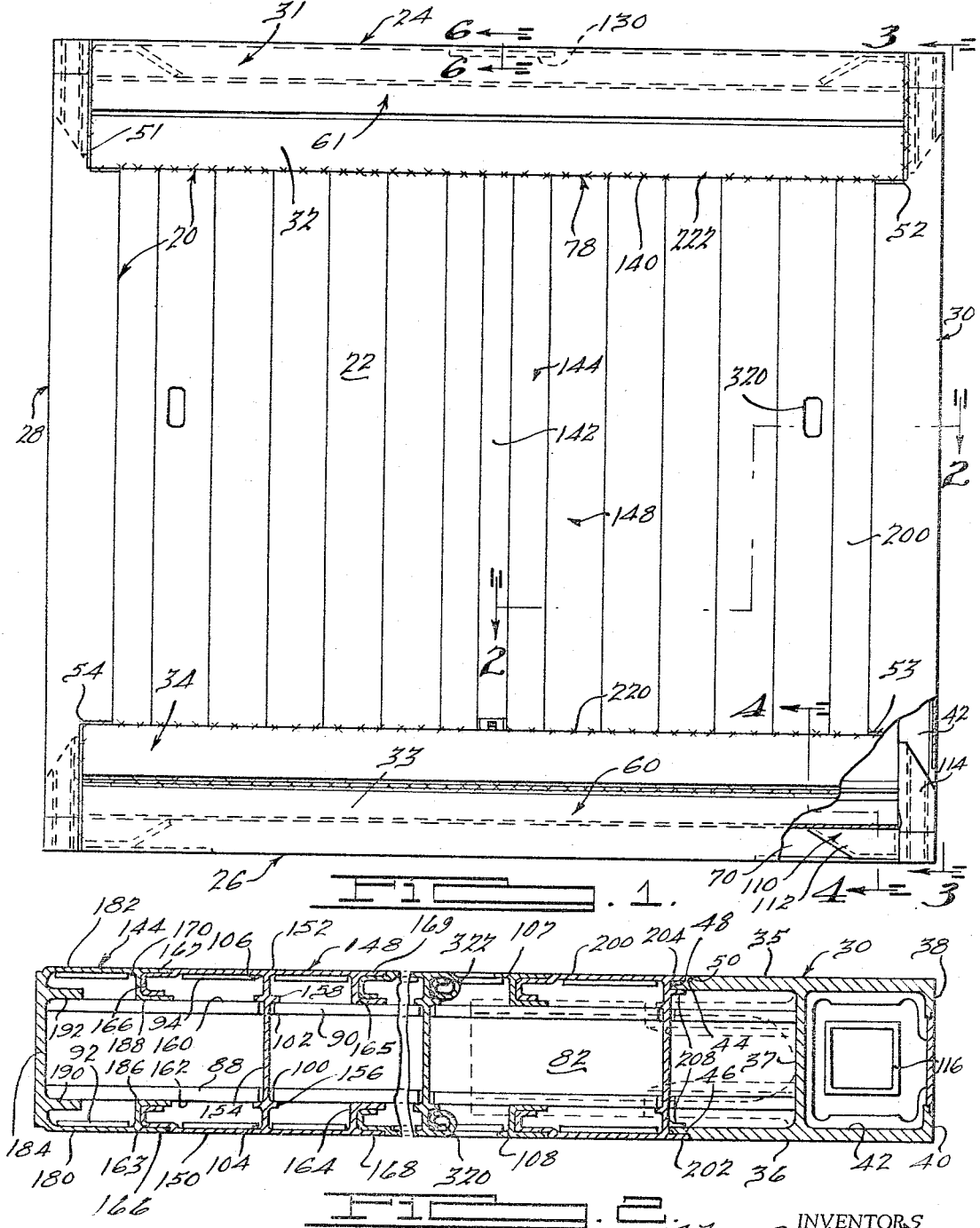
INVENTORS
John P. Moorhead
Harvey W. Chapman
By James R. Bennett
Harness, Dickey & Pierce
ATTORNEYS

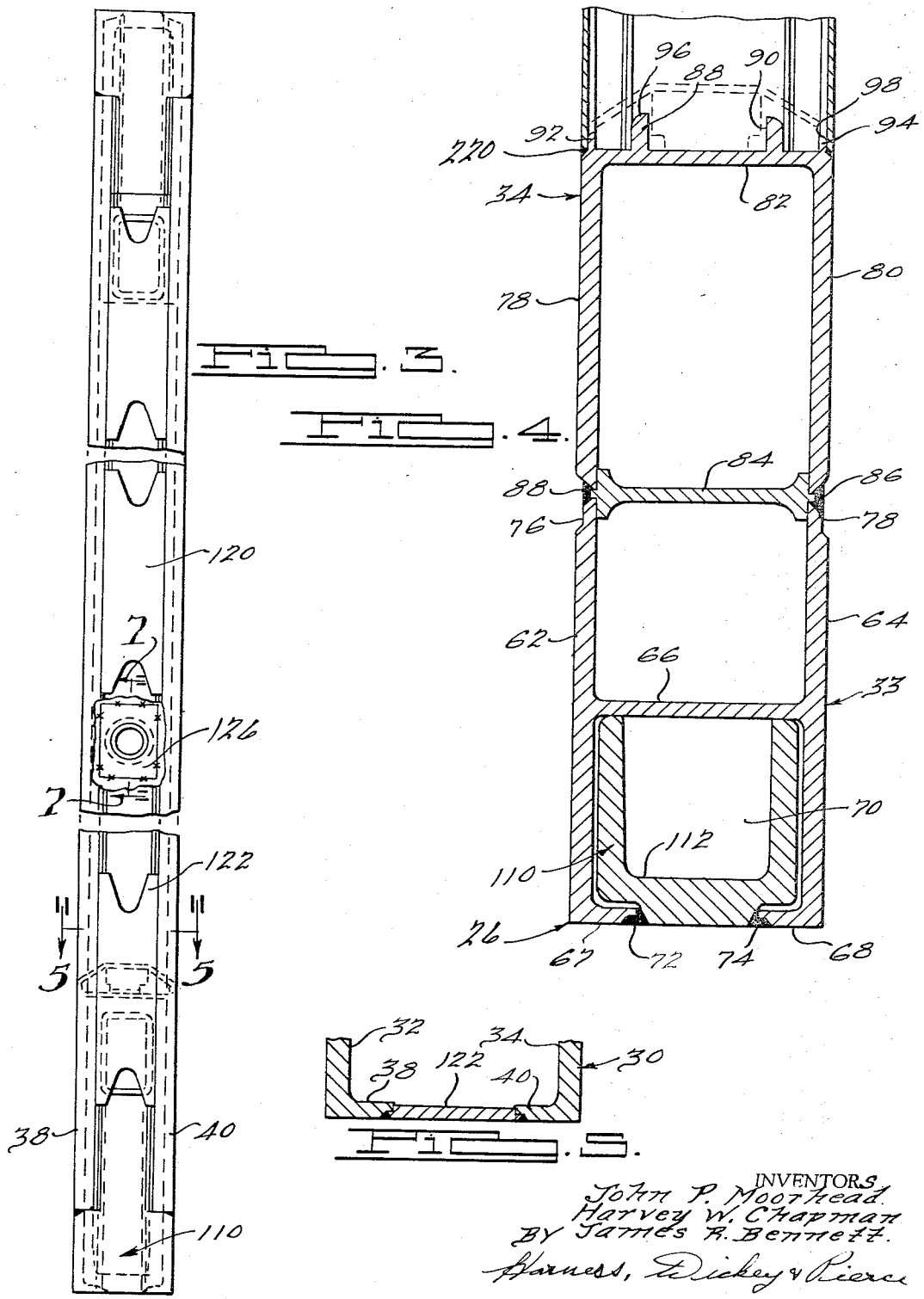

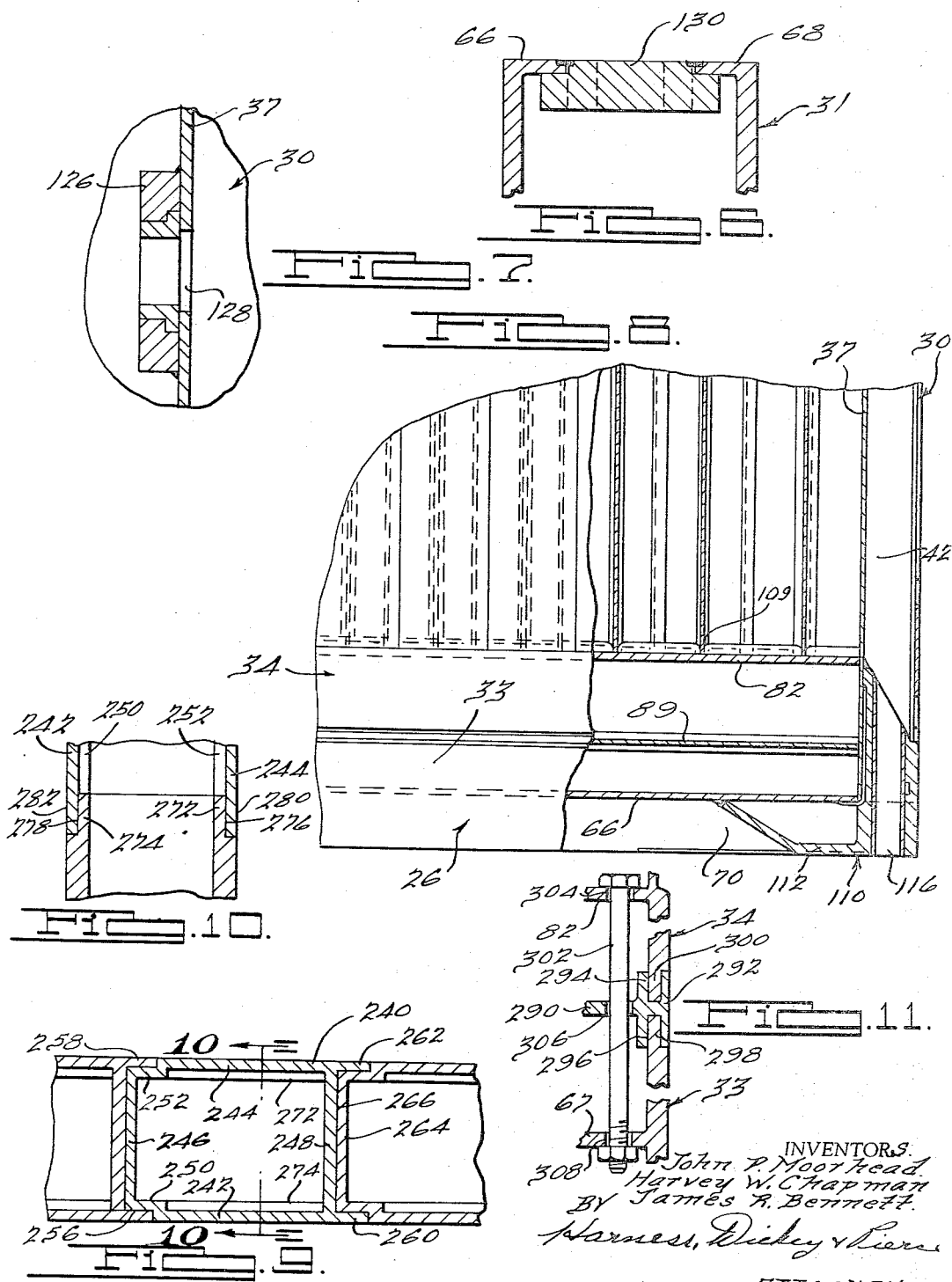

United States Patent Office 3,338,187
Patented Aug. 29, 1967

3,338,187
BULKHEAD
John P. Moorhead, Northville, Harvey W. Chapman, Detroit, and James R. Bennett, New Boston, Mich., assignors to Evans Products Company, Plymouth, Mich., a corporation of Delaware
Continuation of application Ser. No. 181,283, Mar. 21, 1962. This application May 27, 1966, Ser. No. 560,363
4 Claims. (Cl. 105—376)

This invention relates to cargo handling equipment and more particularly to a bulkhead device for partitioning a cargo container such as a railroad boxcar and is a continuation of our copending application of the same title, Ser. No. 181,283, filed Mar. 21, 1962.

A principal object of the present invention is to provide a new and improved bulkhead which is light in weight but which has maximum strength characteristics. To this end it is proposed to provide a bulkhead formed from extruded lightweight structural members made from a material such as aluminum or the like.

Another principal object of the present invention is to provide a bulkhead having sufficient flexibility over a major portion of the cargo engaging surface thereof to substantially reduce breakage in use. To this end, it is proposed to provide a bulkhead comprising a rigid frame which forms a minor portion of the cargo engaging surface and a plurality of individually flexibly connected panel members which are carried by the rigid frame and provide a major portion of the cargo engaging surface.

A further object is to provide novel means of connecting the panel members to the rigid frame and to one another so that maximum flexibility is obtained without loss of required strength. To this end, it is proposed to provide novel interlock means between the panel members and the frame which will permit maximum flexing of the panels under load and provide sufficient rigidity to prevent breakage.

Another object is to provide panel interlock means which are integrally formed in the panel members. Similarly, another object is to provide interlock means for connecting the panel members to the frame which are integrally formed in the panel members and the frame.

Still another object is to provide load bearing and transferring means which are integrally formed in the panel members and on the frame, and which are associated with the interlock means in a manner causing the major portion of the loads applied to the panel members to be transferred to the frame therethrough and preserving a maximum amount of flexibility in the panel members.

A further object is to provide a lightweight bulkhead comprising a plurality of members which are easy to assemble and require a minimum amount of welding and separate fastening means.

An additional object is to provide a new and improved handle means in the cargo engaging surfaces of a bulkhead.

An additional object of the present invention is to provide a bulkhead composed of a plurality of extruded metallic panels mounted in a rigid frame in a manner which facilitates construction of bulkheads of varying widths with similarly formed frame and panel members.

The foregoing objects and others have been attained by incorporation of the inventive principles hereinafter disclosed in an illustrative bulkhead embodiment shown on the accompanying drawing wherein:

FIGURE 1 is a side elevational view, with parts removed, of the illustrative bulkhead embodying the principles of the present invention;

FIGURE 2 is a sectional view taken along the line 2—2 in FIG. 1;

FIGURE 3 is an end view taken along the line 3—3 in FIG. 1;

FIGURE 4 is a partial sectional view taken along the line 4—4 in FIG. 1;

FIGURE 5 is a partial sectional view taken along the line 5—5 in FIG. 3;

FIGURE 6 is a partial sectional view taken along the line 6—6 in FIG. 1;

FIGURE 7 is a partial sectional view taken along the line 7—7 in FIG. 3;

FIGURE 8 is an enlarged partial view, partly in section, of a portion of the apparatus shown in FIG. 1;

FIGURE 9 is a partial sectional view of a modification of the apparatus shown in FIG. 2;

FIGURE 10 is a sectional view taken along the line 10—10 in FIG. 9; and

FIGURE 11 is a partial sectional view of an alternative embodiment of the structure shown in FIG. 4.

Referring now to FIG. 1, a bulkhead comprising a rectangular frame portion 20 and a central panel portion 22 is illustrated. The frame portion 20 comprises upper and lower horizontally extending frame portions 24, 26 and vertically extending side frame portions 28, 30. The frame portions 24, 26 are formed by inner and outer beams 31, 32 and 33, 34. Each of the frame portions are formed from extruded aluminum beams.

The side frame portions 28, 30 are identical in construction and hereinafter described with reference only to the side beam 30. Referring now to FIG. 2, the beams 28, 30 have a substantially I-shaped cross sectional configuration comprising side walls 35, 36 which are interconnected by a web 37. At the outer ends of the side wall portions 35, 36, transverse inwardly extending flanges 38, 40 are formed and define a cavity 42 with the web portion 37. The inner ends of the side wall portions 32, 34 are provided with inwardly stepped side wall surfaces 44, 46 which are connected to the outer and inner surfaces of the side wall portions by inclined surfaces 48, 50. Each of the side frame portions 28, 30 are provided with notches 51, 52, 53, 54 at the ends thereof which open inwardly and are adapted to receive the upper and lower frame portions 24, 26. The frame portions are connected to one another along the notches by suitable welding.

The upper and lower frame portions 24, 26 are substantially identical in construction and therefore only the lower frame portion 26 is described in detail. Referring now to FIGURE 4, the outer beam 33 of the frame portion 26 is shown to have a substantially I-shaped cross sectional configuration and comprises side walls 62, 64 interconnected by a web portion 66. The outer ends of the side wall portions 62, 64 are provided with transverse inwardly extending flanges 67, 68 which define a cavity 70 in conjunction with the web 66. The ends of the transverse flanges may be provided with weld cavities 72, 74 by suitably contoured longitudinally extending slots. The inner ends of the side wall portions 62, 64 are provided with inwardly stepped surfaces 76, 78 as hereinbefore described with reference to the side beams 28, 30. It should be noted that the side beams 28, 30 are identical in construction to the outer beam members 31, 33 of the upper and lower frame portions. There is no difference in the extruded form of the beams 28, 30, 31, 33 and the notches 51, 52, 53, 54 are subsequently machined in the ends of the beams 28, 30.

The inner beams 32, 34 of the frame portions 24, 26 have a U-shaped channel form formed by parallel side wall portions 78, 80 which are interconnected by a web portion 82. The channel shaped inner beams are connected to the I-shaped outer beams 31, 33 by a web plate 84 and suitable welds 86, 88. The web portions 82 of the inner beams are provided with inwardly extending ribs or flanges 88, 90 and 92, 94. The flanges are formed in reversely identical pairs which are identically spaced from one another and the center of the web portion 82. Each of the flanges are provided with outwardly beveled upper surfaces as shown at 96, 98. The flanges are integrally formed during the extrusion process and extend the length of the beams. The flanges are subsequently machined to provide a series of aligned transverse slots 100, 102 and 104, 106 as shown in FIG. 2. The flanges 92, 94 are also provided with additional wider slots 107, 108 for a purpose to be hereinafter described. The edges of the slots may be beveled as shown at 109 in FIG. 8. The spacing of the slots from one another may be varied according to the desired width of bulkhead to be manufactured with the particular beam being machined. For example, in some instances the longitudinal spacing of the slots from one another may be six inches and in other instances seven inches. In this manner the width of the bulkhead to be formed may be varied inch by inch as will be hereinafter described in more detail.

The frame beams are further connected at each corner by corner castings 110 having transversely extending leg portions 112, 114 which are adapted to be received within the beam cavities 70 and 42, respectively, as shown in FIG. 1. The corner castings are welded in place and provide locking pin support and guide apertures 116 in a conventional manner.

In order to provide additional strength around the periphery of the frame, capping plates 120, 122 may be welded between the transverse flanges 38, 40 at suitable intervals, as shown in FIGS. 3 and 5. Referring now to FIGS. 6 and 7, additional variations in the beam structure include latch pin actuating shaft support plates 126 welded to the web 37 and communicating with a shaft hole 128 provided in the web. The only variation between the upper and lower frame portions 24 and 26 is the provision of a hanger plate 130 which is suitably welded between the transverse flanges 67 and 68 of the beam 31. The bulkhead is supported by the hanger plate 130 in a conventional manner.

Referring again to FIG. 1, it may be seen that the frame 20 defines a rectangular opening 140. The area of the opening 140 enclosed by the frame structure is substantially greater than the area occupied by the frame. Consequently, the major cargo engaging portion of the bulkhead is defined by the area enclosed by the frame. The opening 140 is filled with a plurality of vertically extending panel members 22 which extend in abutting relationship between a centrally located cavity or slot 142 and the vertically extending side beams 28, 30. Since the panel members on each side of the central opening 142 are identical, only the panel members extending between the side beam 30 and the opening 142 are hereinafter described in detail. Furthermore, each of the panel members 22 are substantially identical except for the innermost and outermost panel members. Therefore, only one central panel 148 is described in detail. All of the central panels are formed from extruded aluminum material having a substantially I-beam cross sectional configuration.

As shown in FIGURE 2, the beam 148 comprises parallelly extending side walls 150, 152 which are connected by a transversely extending web 154. Transversely extending ribs 156, 158 are formed in the web portion 154 and extend outwardly on each side thereof. The webs 156, 158 are spaced apart a distance substantially equal to the distance between the outer surfaces 160, 162 of the ribs 88, 90 in the web 82 of the beam 34. The ribs 156, 158 are adapted to engage the side surfaces 160, 162 of the ribs 88, 90 in load transferring relationship.

Each end of the side walls 150, 152 of the I-beam panels are provided with integrally formed flanges 163, 164, 165, 166. The flanges 163, 166 are reversely bent to form connecting ribs which run vertically the length of each of the panels. The flanges 164, 165 extend inwardly and then outwardly at right angles to define rib receiving pockets which extend vertically along the length of each of the panels. The width of the ribs 163, 166 is approximately equal to the width of the grooves formed by the flanges 164, 165 so that rib means lockingly nestable within the groove means are provided. Furthermore, the outer surfaces of each of the ribs means is offset inwardly relative to the outer surface of the side walls 150, 152 to provide seats 166, 167 for the side wall ends 168, 169 which form part of the vertically extending grooves. The slots 107, 108 are machined in the ribs 92, 94 in the webs 82 of the inner beams at a location to receive the nested flanges 163, 164, 165, 166 in an interlocked relationship. The inner surface of the interlocked flanges are spaced inwardly a distance equal to the inward spacing of the side surfaces 160, 162 of the ribs 88, 90 to provide an abutment. Consequently, a secondary load-bearing relationship is established between the load bearing ribs 88, 90 and each of the panel members. The outer ribs 92, 94 are not designed as load-bearing members but are utilized rather for locating purposes and to provide a backup for welds between the panel members and the inner beams 32, 34.

The inner end panel 144 is channel shaped in cross section and has parallel side legs 180, 182 interconnected by a web portion 184. Flanges 186, 188 are formed on the ends of the side walls 180, 182 to provide pockets for the rib portions 163, 166 of the adjacent panel. To provide added strength, flanges 190, 192 extend inwardly transversely from the web portion 184 and are adapted to abut the load-bearing ribs 88, 90. The outer end panel member 200 next adjacent the side frame members 28, 30 has a partial I-beam cross sectional configuration and includes shortened side wall portions 202, 204 and parallelly extending ribs 206, 208 which are adapted to be received on either side of the stepped end portions 44, 40 of the side walls 35, 36 of the beam 30.

In this manner interlock means are provided between each of the panels relative to one another and between each of the panels and the upper and lower beams of the frame. The interlock means extend at right angles to one another with the interlock means between the panel members extending substantially vertically and the interlock means between each of the panel members and the upper and lower beams extending substantially horizontally. The only permanent fastening provided between the frame and the panel members are longitudinal welds 220, 222 provided on the inner edges of the upper and lower beam portions. The panel members form a substantially continuous surface between the frame members which presents the major cargo engaging surface in use of the bulkhead. Since the interlock means connecting one panel member to another do not provide a permanent integral connection, a maximum amount of flexing and bending of the panels is permitted in use under load. Accordingly, in the major cargo engaging area of the bulkhead provided by the panels extending between the upper and lower portions of the frame, maximum flexibility consistent with the strength necessary in bulkhead applications is attained.

Referring now to FIGS. 9 and 10, a modified panel form is illustrated having interlock means of a different form. In that embodiment, each of the vertically extending panels 240 have a box-like configuration formed by pairs of opposite parallel side walls 242, 244, 246, 248. The side wall portion 246 is connected to the side wall portions 242, 244 by offsets 250, 252 which provide seating channels 256, 258 to receive side wall extensions 260, 262. Accordingly, a cap portion 264 is provided which is nestable within the confines of a channel 256 extending between the side walls 242, 244 and defined by the side walls 248. The inner beams of the upper and lower frame are channel shaped and provided with longitudinal inwardly extending flanges 272, 274 having inwardly offset channels 276, 278 which provide seats for extensions 280, 282 of the side walls 242, 244 of the panel members. Accordingly, both horizontally extending and vertically extending interlock means are provided between the panel members relative to one another and between panel members and the upper and lower portions of the frame.

An alternative means of connecting the inner and outer beams of each of the upper and lower frame members is shown in FIG. 11. In the modified form the connecting web 84 is replaced by a connecting web 290 having an H-shaped flanged end portion 292 defining a pair of slots 294, 296 within which notched end portions 298, 300 of the inner and outer beam members 33, 34 may be received. In order to secure the two beams to one another, a bolt member 302 extends between the upper web portion 82 and the lower web portion 67 through suitable bolt holes 304, 306, 308 and is securely fastened in place to hold the beams in mating engagement with the web portion 290.

Handle means 320, 322 are formed in one or more of the panel members by severing the side walls of a panel along three sides of a rectangle and rolling the severed portion inwardly about the integral connection with the panel members.

It will be apparent to those skilled in the art to which this invention relates that the aforedescribed illustrative embodiment may be modified and rearranged in various ways without departing from the inventive principles herein disclosed. Consequently, it is intended that the scope of this invention defined by the appended claims include those modifications and variations of the illustrative embodiments which utilize the inventive principles herein disclosed.

What is claimed is:

1. A freight bracing bulkhead assembly comprising a pair of spaced substantially rigid frame members and a plurality of relatively flexible panels extending between said frame members and fixed at their ends to said frame members, said flexible panels comprising at least in part a freight engaging face of said bulkhead assembly, each of said flexible panels comprising a pair of spaced members interconnected by a web member spaced intermediate the longitudinally extending edges of said members, at least one of said members forming a portion of said freight engaging face, each of said members having a generally U-shaped channel at one side thereof extending substantially longitudinally of and generally parallel to the plane of said freight engaging face, means defining a longitudinally extending flange at the other side of each of said members, said flanges being substantially complementary in shape to said U-shaped channels, the flanges of each of said flexible panels being slidingly received in a channel of the adjacent of said flexible panels for flexure of said panels upon the application of loads to said freight engaging face.

2. A freight bracing bulkhead assembly as set forth in claim 1 wherein the pair of frame members are tubular members and form a portion of a frame, said frame further including a second pair of spaced tubular members each of which extends between the respective ends of the first pair of frame members and defining the sides of said frame and means for interconnecting adjacent ends of said members, said connecting means comprising a structural member having a pair of legs each of which is insertable into a respective end of one of said tubular members, the angle between said legs being substantially equal to the angle between the assembled frame members.

3. A bulkhead comprising a rigid frame and a plurality of panel members flexibly supported within said frame, the improvement comprising: pairs of parallelly spaced vertically extending ribs provided on opposite sides of said frame and extending downwardly and upwardly, respectively, relative to said frame, said ribs being provided with oppositely located horizontally spaced notches, web portions formed in each of said panel members and adapted to be received within said notches, and abutment means formed on said web portions and adapted to engage the outer surfaces of said ribs in load transferring relationship when said web portions are located within said notches.

4. In a bulkhead having a rigid frame and a plurality of flexible panel members vertically supported therein between top and bottom frame members, said top and bottom frame members having inwardly projecting flange means extending therefrom, said flange means comprising inner and outer pairs of parallel flanges extending substantially the length of said frame members, a plurality of slots formed in said parallel flanges, said panel members having a transverse web portion mounted in and extending between opposite pairs of slots in said inner pair of flanges, said web portions having transverse flange means adapted to abuttingly engage the side surfaces of said inner pair of parallel flanges, U-shaped flange means formed at each corner and extending the length of said panel members, the U-shaped flange means defining pockets of varying sizes so that the U-shaped flange means on one panel member is nestable with the adjacent U-shaped flange means on the adjacent panels, and the nested U-shaped flange means of the panel members extending inwardly through oppositely located slots in the outer pair of parallel flanges and abuttingly engaging the outer surfaces of the inner pair of parallel flanges.

References Cited

UNITED STATES PATENTS

| | | | |
|---|---|---|---|
| 2,891,638 | 6/1959 | Grundy | 189—34 |
| 3,063,388 | 11/1962 | Magarian et al. | 105—376 |
| 3,111,203 | 11/1963 | De Ridder | 189—34 |
| 3,111,205 | 11/1963 | Gresham | 189—34 |

ARTHUR L. LA POINT, *Primary Examiner.*

D. E. HOFFMAN, *Assistant Examiner.*